United States Patent Office 3,449,067
Patented June 10, 1969

3,449,067
PRODUCTION OF SODIUM BICARBONATE
Karl Otto Schmitt, Mannheim, Guenter Hansen, Frankenthal, Pfalz, and Hans Mueller, Ludwigshafen (Rhine), Germany, assignors to Badische Anilin- & Soda-Fabrik Aktiengesellschaft, Ludwigshafen (Rhine), Germany
No Drawing. Filed Mar. 2, 1966, Ser. No. 531,071
Claims priority, application Germany, Mar. 9, 1965, B 80,880
Int. Cl. C01d 7/18
U.S. Cl. 23—65    4 Claims

ABSTRACT OF THE DISCLOSURE

In the production of sodium bicarbonate and ammonium chloride by stepwise reaction of ammonia and carbon dioxide in a recycled mother liquor containing sodium chloride, the whole amount of ammonia is introduced into the mother liquor in a first stage and, at the same time or separately, carbon dioxide is introduced in the amount necessary to form a solution practically saturated with sodium bicarbonate. A temperature of not more than 60° C. is maintained. The mother liquor is then introduced—if desired, after cooling—at a maximum temperature of 35° C. into a second stage to which the remaining amount of carbon dioxide is supplied without further cooling. The precipitated sodium bicarbonate is separated, fresh sodium chloride is dissolved in the mother liquor, which, after the removal of ammonium chloride by cooling, is recycled to the first stage.

---

The present invention relates to a process for the production of sodium bicarbonate by stepwise reaction of ammonia and carbon dioxide in a recycled mother liquor containing sodium chloride.

In the production of sodium bicarbonate by reaction of aqueous solutions containing sodium chloride with ammonia and carbon dioxide according to the equation:

$$NaCl + NH_3 + CO_2 + H_2O \rightarrow NaHCO_3 + NH_4Cl$$

the sodium bicarbonate precipitated in solid form is separated from the solution. Ammonia is as a rule liberated from the mother liquor by the action of caustic lime and reused. Methods are known however in which solid ammonium chloride is crystallized out from the said solution, for example after saturation with sodium chloride followed by cooling, the ammonium chloride also being separated from the mother liquor and recovered as such. Sodium bicarbonate can again be precipitated from this mother liquor by treatment with ammonia and carbon dioxide.

For this purpose, the necessary amount of ammonia, which may also contain some of the carbon dioxide required for the reaction, is first absorbed in the solution freed from solid ammonium chloride, the bulk of the carbon dioxide only then being supplied. Absorption of the carbon dioxide may be effected batchwise in reaction vessels or continuously in high columns having numerous trays into which the ammoniated solution is introduced at the top and the carbon dioxide at the bottom. The solution containing the solid sodium bicarbonate is withdrawn at the bottom of the column.

Considerable amounts of heat are liberated during the absorption of the ammonia into the aqueous solution, during the subsequent reaction with carbon dioxide and during crystallization of the sodium bicarbonate, and some of this heat has to be carried away in the column by cooling means installed therein. It is unavoidable that the cooling surfaces become encrusted with sodium carbonate being precipitated, so that their efficiency declines fairly rapidly. The columns therefore have to be cleaned at frequent intervals. For this purpose, fresh ammoniated liquor is passed into the column by which the deposits are redissolved.

The object of the present invention is to provide a process for the production of sodium bicarbonate and ammonium chloride by stepwise reaction of ammonia and carbon dioxide in a recycled mother liquor containing sodium chloride wherein incrustation of the cooling surfaces is reduced.

This object can be achieved in said process by stepwise reaction of ammonia and carbon dioxide in a recycled mother liquor containing sodium chloride, separation of the sodium bicarbonate precipitated in solid form, dissolving fresh sodium chloride in the mother liquor, cooling the mother liquor to withdraw ammonium chloride and returning the mother liquor to the reaction zone by introducing the whole amount of ammonia into the mother liquor in a first stage and introducing carbon dioxide in the amount necessary to form a solution practically saturated with sodium bicarbonate, while maintaining a temperature of not more than 60° C., then introducing the mother liquor at a maximum temperature of 35° C. into a second stage to which the remaining amount of carbon dioxide required to precipitate sodium bicarbonate is supplied without further cooling.

It is important that the heat formed during absorption and reaction should be withdrawn from the mother liquor while this does not contain solid sodium bicarbonate. By adjusting the temperature of the mother liquor to a maximum of 35° C. prior to its entry into the second stage, further cooling of the liquor in this stage is no longer necessary. For example if the liquor is introduced into this stage at a temperature of 20° to 35° C., the temperature in this stage rises by the reaction with the remaining amount of carbon dioxide to 35° to 50° C. which is a temperature range in which sodium bicarbonate is obtained in a readily separable form.

A substantial part of the heat produced may also be carried away in the first stage. In this stage the whole amount of ammonia and only such an amount of carbon dioxide is introduced into the mother liquor that a sodium bicarbonate solution is obtained which is practically saturated at the temperature used. Ammonia and carbon dioxide may be introduced simultaneously or separately. Provision is made that the temperature in this stage does not rise above 60° C. since otherwise the carbon dioxide is not reacted. The temperature in this stage should on the other hand advantageously be above 35° C.

The process in accordance with this invention may be carried out for example by continuously introducing the mother liquor containing sodium chloride and ammonium chloride together with the amounts of carbon dioxide and ammonia necessary for maintaining the concentration, into a container, advantageously in the form of a tower, which is filled with a solution practically saturated with sodium bicarbonate. At the same time the equivalent amount of reacted liquor is withdrawn from the tower. To carry away the heat formed, the tower may be provided with cooling means. Either here or by an interposed cooler, the liquor is cooled to temperatures of not more than 35° C. and introduced at this temperature into a second tower reactor filled with already reacted solution containing precipitated sodium bicarbonate suspended therein. Carbon dioxide is passed into this vessel at the same time and the amount of already reacted liquor equivalent to the amount of liquor supplied, together with the sodium bicarbonate suspended therein is withdrawn. It is also possible to complete carbonization of the liquor in a number of reactors connected in series. In contrast to the first stage, the carbon dioxide introduced into the second stage is not completely absorbed. The unabsorbed portion, after it has left the reactor, may advantageously be reused for treating the liquor in the first stage. Obviously treatment of the liquor with gas in the first stage may similarly be carried out in a number of containers, care being taken that the temperature does not rise above 60° C. in any of them.

The invention is illustrated by the following example.

EXAMPLE 8 cubic meters per hour of a solution containing per cubic meter 200 kg. of sodium chloride, 120 kg. of ammonium chloride, 30 kg. of ammonium sulfate and 82 kg. of ammonium carbonate is introduced into a container having a height of 4 meters and a diameter of 1.2 meters. During the same period, 90 cubic meters of carbon dioxide and 220 cubic meters of ammonia are continuously introduced. As soon as the container is full, an amount of precarbonized liquor equivalent to the amount supplied leaves through an overflow located near the top of the container. The temperature of the solution within the container is kept at about 45° C. The liquor leaving the container is cooled in a cooler to about 28° C. and then introduced into a tower 12 meters in height and having a capacity of 40 cubic meters into which 350 cubic meters of carbon dioxide per hour is passed at the same time without further cooling. Here again, when the tower is full, the solution together with the precipitated sodium bicarbonate is withdrawn through an overflow. The temperature of the solution inside the tower rise ot 42° C. The sodium bicarbonate is then separated from the mother liquor in the usual way, for example with filters and/or centrifuges. The mother liquor is saturated with sodium chloride cooled to 20° C. and the deposited ammonium chloride is separated. The mother liquor which has been treated in this way is then returned to the first container.

840 kg. per hour of sodium bicarbonate is obtained in the form of coarse crystals.

No incrustation whatever forms in the first container in which no solid bicarbonate is formed, whereas the walls of the second container become coated with a thin layer of sodium bicarbonate which is so impervious that the container wall is protected from corrosion by the liquor. This layer grows so slowly that the container may be kept in uninterrupted use for several weeks before cleaning becomes necessary. This layer may then be easily removed by the action of steam or ammoniated mother liquor.

We claim:

1. A process for the production of sodium bicarbonate and ammonium chloride by reaction of ammonia and carbon dioxide in a mother liquor containing sodium chloride wherein in a first stage the whole amount of ammonia is introduced into the mother liquor and only such an amount of carbon dioxide which is necessary for the formation of such an amount of sodium bicarbonate that the liquor is almost saturated while maintaining the liquor at a temperature of not more than 60° C., then introducing the said mother liquor at a temperature of not more than 35° C. into a second stage into which the remaining portion of the amount of carbon dioxide required is introduced, precipitating the sodium bicarbonate without cooling, separating the precipitated sodium bicarbonate, dissolving fresh sodium chloride in the remaining liquor, cooling said liquor for the precipitation of ammonium chloride, separating said ammonium chloride and returning said liquor to said first stage.

2. A process as claimed in claim 1 wherein the temperature in the first stage is kept at about 35° C.

3. A process as claimed in claim 1 wherein the temperature in the second stage is kept at 20° to 35° C.

4. A process as claimed in claim 1 wherein the mother liquor is cooled prior to its introduction into the second stage.

References Cited

UNITED STATES PATENTS

| 2,622,004 | 9/1951 | Miller et al. | 23—65 |
| 2,787,521 | 6/1951 | Roberts et al. | 23—65 |

OSCAR R. VERTIZ, Primary Examiner.

H. S. MILLER, Assistant Examiner.

U.S. Cl. X.R.

23—100